March 29, 1966    J. D. SMITH    3,242,791
VIBRATION ABSORBING DEVICE FOR MACHINE TOOLS
Filed Jan. 27, 1964    3 Sheets-Sheet 1

James Derek Smith
INVENTOR

BY Wenderoth,
Lind & Ponack, ATTORNEYS

March 29, 1966  J. D. SMITH  3,242,791
VIBRATION ABSORBING DEVICE FOR MACHINE TOOLS
Filed Jan. 27, 1964  3 Sheets-Sheet 2
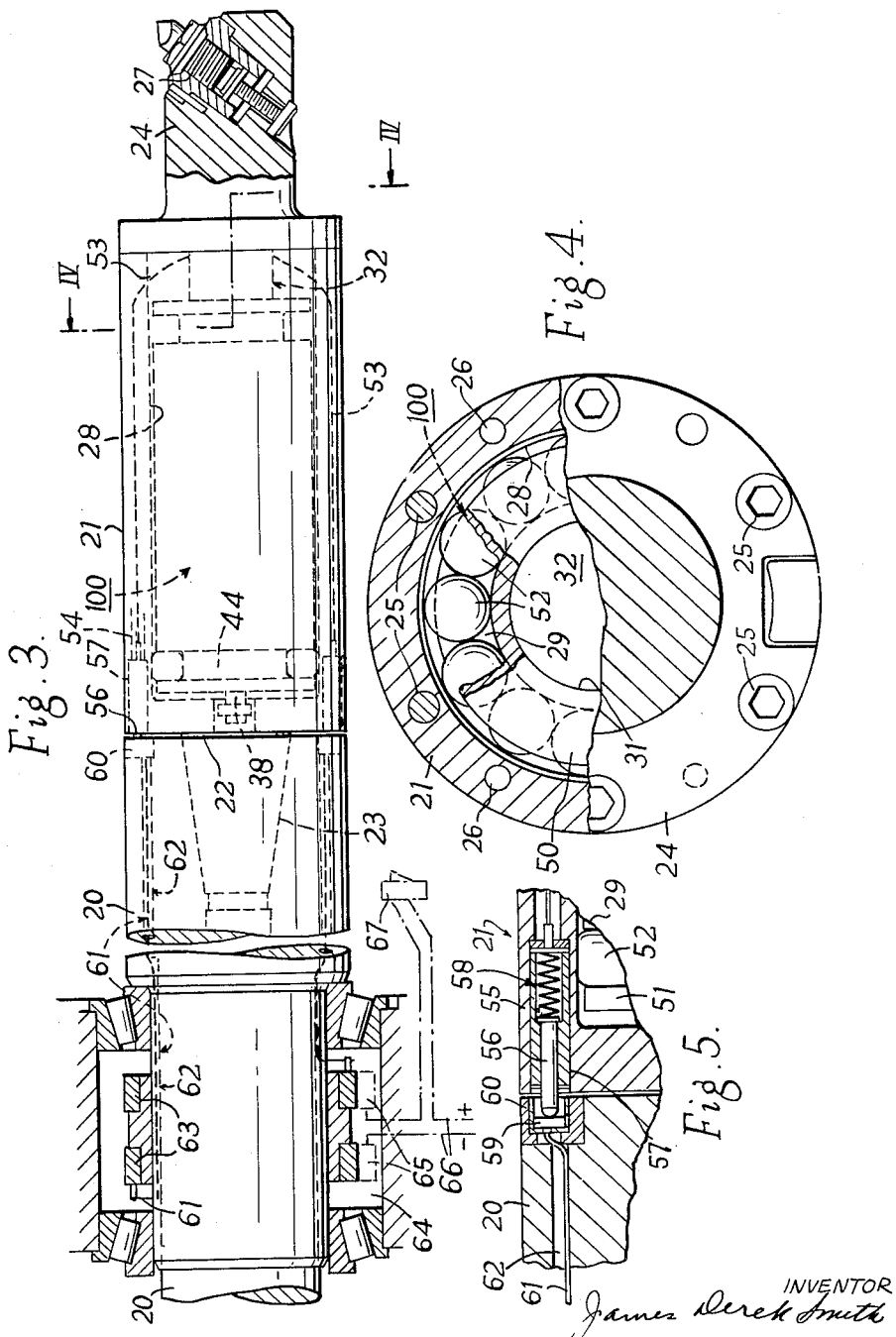
INVENTOR
James Derek Smith
BY Wenderoth,
Lind & Ponack ATTORNEYS March 29, 1966  J. D. SMITH  3,242,791
VIBRATION ABSORBING DEVICE FOR MACHINE TOOLS
Filed Jan. 27, 1964  3 Sheets-Sheet 3
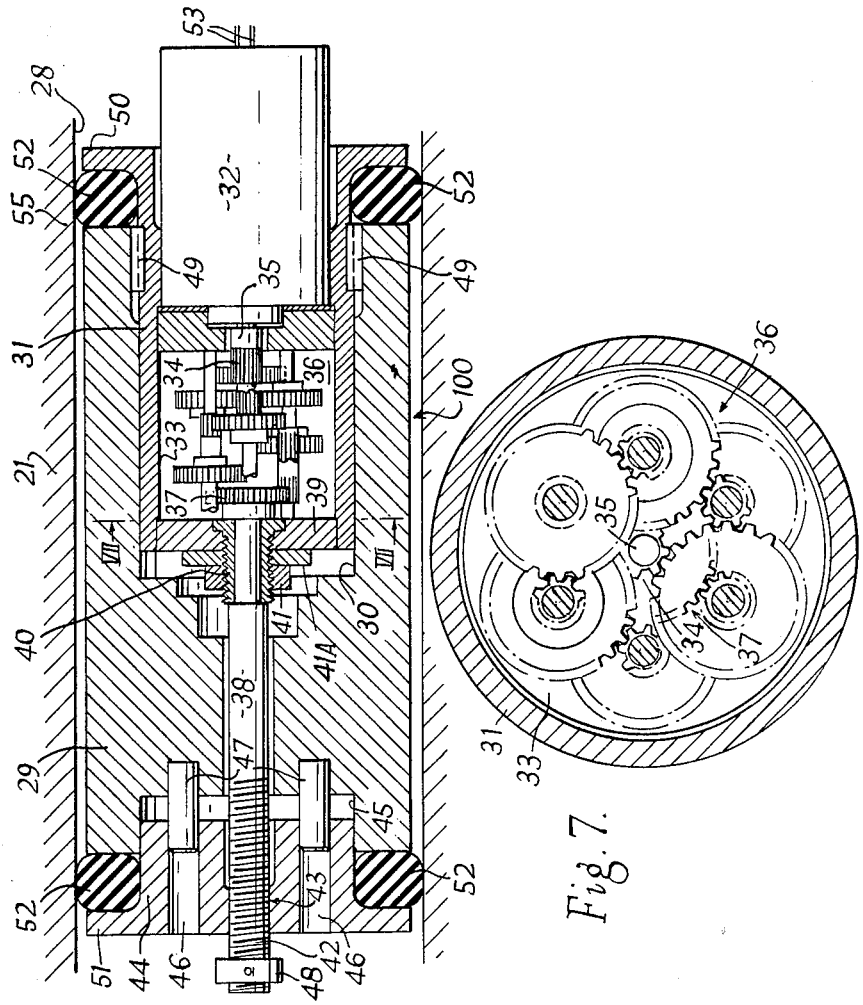
James Derek Smith
INVENTOR
BY Wenderoth,
Lind & Ponack, ATTORNEYS

United States Patent Office 3,242,791
Patented Mar. 29, 1966

3,242,791
VIBRATION ABSORBING DEVICE FOR
MACHINE TOOLS
James D. Smith, Bedford, England, assignor to George
Richards & Company Limited, Lancashire, England, a
British company
Filed Jan. 27, 1964, Ser. No. 340,217
15 Claims. (Cl. 188—1)

The present invention relates to the absorbing or suppressing of vibrations in a member subject during use to vibration, such as parts of machine tools. The main object of this invention is to provide improved means for absorbing or suppressing vibration in stationary or moving members subject to vibration.

More particularly it is an object of the present invention to provide for the absorption of vibration in boring bars. When the unsupported length of a boring bar is high in relation to its diameter, its stiffness in consequence is low and tool chatter sets in at quite low material removal rates. The means of absorbing vibration in boring bars provided in accordance with the present invention permit greater material-removal rates to be obtained, or alternatively permits the use of boring bars having a greater unsupported length-to-diameter ratio for an equivalent material-removal rate.

The means hereinafter to be described for achieving these objects can, however, be applied also to the absorption of vibration in other parts of machine tools, such as the columns and/or overarms of milling machines, for example.

It is already known that the effective dynamic stiffness of a vibrating member can be increased by connecting an auxiliary mass to it through a damped spring. The system then exhibits two resonant frequency peaks and, by careful selection of the spring, the amplitude of vibration at these two peaks may be made approximately equal and very considerably lower in value than the amplitude at the resonant frequency of the member to which the auxiliary mass is connected for a particular value of alternating force.

A boring bar, for example, may in practice be utilised at different unsupported lengths and be subjected to varying loadings depending upon the depth of cut to be taken and the nature of the material being cut. In consequence, absorption of vibration in such a member by means of an auxiliary mass connected to it by a damped spring will be relatively ineffective in reducing the amplitude of vibration unless the spring stiffness can be tuned to the correct frequency for maximum reduction in vibration amplitude of the boring bar.

It is, therefore, another object of the present invention to provide simple means for achieving this result.

The present invention depends upon the use of a high-hysteresis elastic material to act both as the spring and the damper arranged between the auxiliary mass and the vibrating member. The elastic material is preferably a high-hysteresis elastomeric material, that is, a material which is essentially of a rubbery nature, in which a high proportion of energy is dissipated when it is subjected to vibration. A variety of such materials are known, but for the purpose of the present invention, it is found that nitrile rubbers have very satisfactory characteristics, although polyvinyl chloride compositions may also be used successfully. Elastomeric materials particularly suitable for use as combined spring and damper elements in accordance with this invention have a mechanical hysteresis which is characterized by the equation, tan $\delta\Delta\cdot25$, where $\delta$ is the energy "loss" angle as derived from a hysteresis loop. Nitrile rubber is also preferred because of its non-creep character.

According to the present invention vibration absorbing means for a primary body subjectable to vibration, said means comprising an auxiliary mass juxtaposed to said body, high-hysteresis elastic material arranged between said body and said mass to couple them elastically, and means for tuning the stiffness of said material to the correct frequency for maximum reduction in vibration amplitude of the primary body.

The abovementioned stiffness tuning is conveniently effected by deforming the high-hysteresis elastic material to alter the elastic coupling between said body and said mass, and such tuning may compensate for stiffness change in said elastic material due to temperature rise. Preferably at least two masses of the high-hysteresis elastic material are arranged at longitudinally spaced coaxial zones.

More particularly, the invention may be considered as providing means for altering the effective dynamic stiffness of a cylindrical metallic tool-supporting member, such as a boring bar, subject during operation to vibration, said means comprising another cylindrical metallic member arranged concentrically about the same longitudinal axis as said tool-supporting member (without metal-to-metal physical contact between the two members), combined spring and damper elements formed of high-hysteresis elastomeric material interposed and forming the sole bridging connection between said members, and means for deforming said high-hysteresis elastomeric material to alter the stiffness of the bridging connection between said two members to adjust the degree of elastic coupling of said spring and damper elements with said concentric members.

The cylindrical tool-supporting member may be hollow and the other cylindrical member may be accommodated within the hollow tool-supporting member, or the tool-supporting member may be accommodated within the other member which is of sleeve form. The spring and damping material employed may be in any suitable forms, such as a toroid or a ring of balls or other pieces.

In one construction a cylindrical block acts as the auxiliary mass and at least two combined spring and damper elements formed of high-hysteresis elastomeric material are positioned at two longitudinally spaced intervals in relation to the auxiliary mass and projecting radially of a cylindrical surface of said auxiliary mass to engage an opposed cylindrical surface of a member subject to vibration. Means are provided for adjusting the effective stiffness of the elastomeric material elements by distortion of their cross-sectional shapes. The simplest means of distorting the elastomeric spring and damper elements is to vary a load imposed on them in a direction parallel to the axis of the auxiliary mass, but distortion can also be achieved by acting on the elements in a direction radial to said mass.

In order that the invention may be more readily understood reference is directed to the accompanying drawings, in which:

FIGURE 3 is a longitudinal elevation showing the application of the first arrangement (that is, the FIGURE 1 arrangement) to a rotating boring bar; this embodiment incorporates remotely controlled tuning means for absorbing vibration during boring operations;

FIGURE 4 is a view—partly in section—on line IV—IV in FIGURE 3;

FIGURE 5 is a detail view of motor terminal means hereinafter described;

FIGURE 6 is a longitudinal section through the vibration absorbing device used in the boring bar arrangement shown in FIGURE 3, showing the remotely controllable electric motor and speed reduction gear unit provided for effecting distortion of the elastic coupling means between the vibration absorbing device and an extension of the boring bar; and FIGURE 7 is a cross-section on line VII—VII of FIGURE 6.

Figure 1:
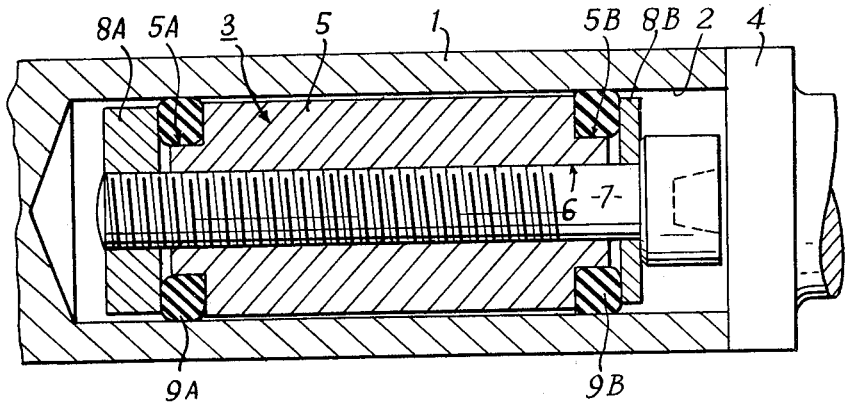
FIGURES 1 and 2 are respectively longitudinal sections showing diagrammatically the positioning of the auxiliary mass inside and around a tool-supporting member.

In the simple example of applying a vibration absorbing device to a boring bar, as diagrammatically illustrated in FIGURE 1, the boring bar 1 is provided with an axial recess 2 to receive the vibration absorber 3, which is placed as close as is practicable to the unsupported end of the bar, on which may be secured a tool holder 4.

The vibration absorber 3 consists of a main block 5 in the form of a solid cylinder to provide the bulk of the auxiliary mass, said block 5 having an axial hole 6 to receive a clamping bolt 7. The diameter of recess 2 is only slightly larger than the outside diameter of block 5; there is no direct metal-to-metal contact between the vibration absorber and the bar recess. The main block 5 is given as great a mass as is possible within the limitations imposed by the space available within the boring bar recess 2 and, where economic considerations allow, may be made of a special, high specific gravity alloy. Shoulders 5A, 5B formed at opposite ends of the block 5 co-operate with end washers 8A, 8B respectively to form annular seating grooves for two combined spring and damper elements 9A and 9B, of toroidal form in the free state, and both made of the same high-hysteresis elastomeric material, preferably nitrile rubber. The two end washers 8A, 8B are held in place by the clamping bolt 7 which passes freely through an aperture in washer 8B but makes screw-threaded engagement with washer 8A.

It will be appreciated that the tightening of the clamping bolt 7 will cause washers 8A, 8B to distort the shape of the toroidal elements 9A, 9B so that said elements bridge the gap between block and recess and thus couple the block 5 and boring bar 1 togeher elastically. Further tightening of the clamping bolt 7 will compress the elements 9A, 9B more firmly against the surface of the bar recess 2 and by reason of distortion will increase the area of contact between said bar and the toroidal elements. This increases the stiffness of the toroidal elements between the auxiliary mass formed by the main block 5 and associated parts of the vibration absorber 3 and the boring bar 1. Variation of the end loading on the toroidal elements 9A, 9B to increase their area of contact with the surface of the boring bar recess 2 has the effect of increasing their stiffness to lateral deflections and hence increases the resonant frequency of vibration of the auxiliary mass in its resilient support, furnished by the elastomeric toroidal elements.

Figure 2:
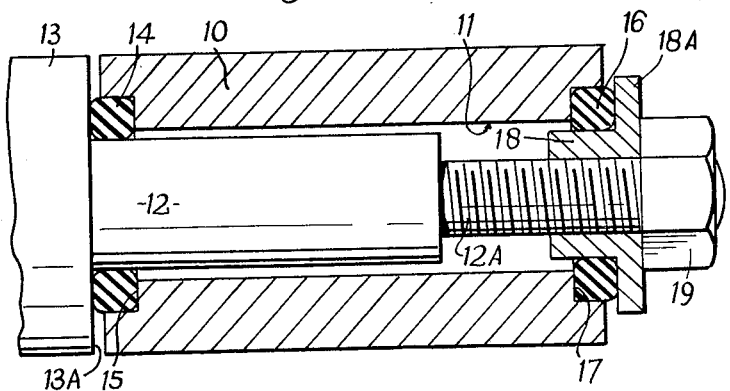

Instead of being located internally, as above described, a vibration absorber in accordance with the present invention may be located externally of the member by which it is carried. An example of such a construction of vibration absorber is shown in FIGURE 2, wherein the auxiliary mass takes the form of a cylindrical sleeve 10, within the bore 11 of which is received concentrically a reduced spigot 12 on the end of boring bar 13. One annulus for accommodating a toroidal spring and damper element 14 is provided at one end of sleeve 10 by a counterbore 15, said element 14 embracing the spigot 12 and abutting a shoulder 13A of the boring bar 13.

Another toroidal spring and damper element 16 is trapped between a counterbore 17 at the other end of said sleeve and a bush 18 having a flange 18A (said element 16 seating in the corner formed by the bush and its flange), said bush 18 being slidable along an axial screw-threaded extension 12A of spigot 12. A nut 19 engaging extension 12A may be turned to alter the distance between the bar shoulder 13A and the bush flange 18A and so vary the compression applied to elements 14 and 16.

The elastic properties of high-hysteresis elastomeric materials change with rise in temperature, and this factor may be fully compensated for automatically. A boring bar taking a heavy cut becomes considerably heated in operation and it is therefore desirable that the vibration absorber should be self-adjusting within the temperature range, within which the boring bar is designed to operate. The natural stiffness of the elastomeric material falls with increase in temperature, but at the same time its volume increases and this factor leads to an increase in the distortion to which the elastomeric elements are subjected. It will be seen therefore that the natural expansion of the elastomeric material may, by suitable design of the geometry of the annular seatings for the elastomeric elements, sufficiently counteract the effects of increase of temperature.

Correct shaping of the recesses in which the elastomeric elements are accommodated may produce substantial compensation for the change referred to, at least within a predetermined temperature range. It has been found in practice that toroidal elements positioned in V-grooves achieve considerable self-compensating effects.

Although distortion of the elastic coupling means would usually be effected by manual adjustment, such distortion may also be effected as and when required by remote control. An example of such an arrangement is shown in FIGURES 3 to 7, in which remote or manual control is effected by the machinist.

In the arrangement shown in FIGURES 3 to 7 the rotatable boring spindle 20 of a horizontal boring machine supports a co-axial extension in the form of a cylindrical housing 21 which is detachably connected to the spindle 20 at its inner end by a conventional tapered spigot 22 on the housing fitting within a complementary socket 23 in the spindle end. On its outer end the housing 21 carries a replaceable tool adaptor 24 (secured in any suitable manner, such as by screws 25 and dowels 26) said adaptor supporting a micrometer adjustment tool holder 27 of conventional form.

Within the bore 28 of the housing 21 is accommodated the vibration absorber 100 which comprises essentially a cylindrical block 29 of slightly smaller size than the housing bore 28. In a deep recess 30 in one end of the block 29 is housed a long hub 31 enclosing a small electric motor 32 and a speed reduction gear box 33, a toothed pinion 34 on the projecting end of the motor armature 35 forming the first element of a gear train 36. The gear train 36 terminates at a spur wheel 37 carried by a spindle rod 38 having one end journalled in a bush 40 in an end plate 39 of said gear box 33, and secured by a nut 41 bearing against a washer 41A.

The other end of the spindle rod 38 has an externally screw-threaded portion 42 which makes screwed engagement with a screw-thread 43 in a second and shorter hub 44 slidably received in a counterbore 45 in the other end of the block 29. This second hub 44 is held against rotation by the engagement within parallel bores 46 therein of guide pins 47 carried by the block 29, outward movement of said second hub 44 being limited by a stop collar 48 pinned on the extremity of the spindle rod 38.

It will be understood, therefore, that a slow rotary movement imparted to said spindle rod 38 from motor 32 through the speed reduction gear train 36 will result in longitudinal displacement of the second hub 44 relatively to the first hub 31 which houses the motor-gear unit and which is held against rotation in block 29 by keys 49.

Annular recesses are formed between the flanges 50, 51 of first and second hubs 31, 44 respectively, and the opposite ends of block 29 and within these recesses are clamped masses of high-hysteresis elastomeric material, such as a nitrile rubber. This material could be of toroidal form, as in the arrangements previously described, or may comprise a series of circumferentially abutting balls 52, as shown in FIGURE 4 or other suitably shaped pieces). When the vibration absorber is first assembled within the housing 21 the hubs 31, 44 are adapted to apply moderate pressure along the longitudinal axis of block 29 and housing 21 to bulge the balls 52 into contact with the housing bore 28 and thus elastically couple together the vibration absorber 100 and the boring spindle extension housing 21.

Relative movement between hubs 31 and 44 deforms the trapped balls 52 and increases their area of contact with the housing bore 28 to alter the elastic coupling between spindle-extending housing 21 and the vibration absorber 100 comprising block 29 and its contents and associated parts. As already mentioned, relative movement between hubs 31 and 44 results in this embodiment from operation of the motor 32 as and when required, and for this purpose leads 53 from the motor 32 are accommodated in passageways 54 (FIG. 3) extending longitudinally through the wall 55 of housing 21 to connect with depressible terminal pins 56. The pins 56 are slidable in cartridges 57 recessed into the housing wall 55 and have biasing springs 58 which urge the terminal pins 56 outwardly—see especially FIGURE 5.

When the housing 21 is mounted by its tapered spigot 22 on the boring spindle 20 the projecting terminal pins 56 are contacted and pressed back (against the resistance of springs 58) by fixed terminal buttons 59 carried in cups 60 carried by said spindle 20. Further leads 61 extend through longitudinal passageways 62 in spindle 21 to emerge opposite and connect with slip rings 63 situated, for example, in the spindle bearing housing 64. Brushes 65 connect the motor circuit with a power source 66 and to a pendant switch 67 (or the like) readily accessible for operation by the machinist.

I claim:

1. Means for altering the dynamic stiffness of a cylindrical tool-supporting member subject during operation to vibration, said means comprising a further cylindrical member arranged about the same longitudinal axis as said tool-supporting member and connected only to said tool-supporting member, combined spring and damper elements formed of high-hysteresis elastomeric material interposed and forming the sole bridging connection between said tool-supporting member and said other cylindrical member, and means bearing on said damper elements for deforming said elastomeric material to alter the stiffness of the bridging connection and thus adjust the degree of elastic coupling between said spring and damper means and said cylindrical members.

2. Means as claimed in claim 1, in which said cylindrical tool-supporting member is hollow and said further cylindrical member is accommodated within the hollow of the tool-supporting member.

3. Means as claimed in claim 1, in which said further cylindrical member is of sleeve form and said tool-supporting member is accommodated within the sleeve.

4. Means as claimed in claim 1, wherein said elastomeric spring and damper elements, when in the free state, have a toroidal form.

5. Means as claimed in claim 1, wherein said elastomeric spring and damper elements consist of circumferentially arranged separate pieces.

6. Means as claimed in claim 1, wherein said spring and damper elements are composed of nitrile rubber.

7. Means as claimed in claim 1, wherein said spring and damper elements are composed of a polyvinyl chloride composition.

8. Means for absorbing or suppressing vibration in a bar-like component of a machine tool which has a recess extending axially within said bar-like component; said means comprising a block within said axial recess, said block being slightly smaller in size than said recess; a spindle extending through said block; plate members disposed adjacent opposite ends of said block and supported on said spindle for axial displacement mutually and relatively to said block; toroidally arranged elastic coupling means comprising masses of high-hysteresis elastic material held in spaces formed between said block and said relatively displaceable plate members and projecting therefrom to contact the surface of said component recess enclosing said block, to couple said block elastically to said component, and power-operated means coupled to said spindle for displacing said plate members relatively to vary the degrees of compression of said elastic coupling means and thus alter the degree of elastic coupling between said block and said component, thereby tuning the vibratory block and associated coupling means to match the frequency of vibration of said bar-like component.

9. In a rotatable spindle boring machine, a remotely controlled tunable means for absorbing or suppressing vibration in a boring bar on the spindle of said machine, said means comprising a hollow cylindrical housing adapted to form a rigid axial extension of the rotatable boring spindle, said extension being adapted to be interposed between an end of said spindle and a boring tool holder; a cylindrical block within said hollow axial extension, said block having coaxial recesses in its opposite ends and being slightly smaller in size than the bore of said extension; hubs supported in said block end recesses and adapted for axial displacement mutually and relatively to said block; masses of high-hysteresis elastomeric material held in annular spaces formed between said block and said relatively displaceable hubs, said elastomeric masses projecting from said spaces to contact the bore of said extension to couple said block elastically to said extension; an exteriorly controllable electric motor and speed reduction gear unit accommodated in one hub, and a member extending axially within said block and engaging the other hub for imparting longitudinal displacement thereto, said motor being controllable at will during boring operations to effect through said motor-gear unit axial displacement of said hubs to vary the degree of deformation of said elastomeric masses and thus alter the degree of elastic coupling between said block and said spindle extensions, thereby tuning the vibratory block and associated elastomeric masses to match the frequency of vibration of said extension and associated boring spindle and tool holder 10. Means as claimed in claim 1, in which said means for deforming said elastomeric spring and damper elements comprises means bearing on said spring and damper elements for exerting a compressive force thereon in a direction transverse to the direction in which said elements extend between said cylindrical members.

11. Means as claimed in claim 1, in which said means for deforming said elastomeric spring and damper elements comprises means bearing on said elements for applying radially expanding pressure thereto.

12. Means as claimed in claim 5, in which said separate pieces are balls.

13. Means for altering the dynamic stiffness of a cylindrical tool-supporting member subject during operation to vibration, said means comprising a further cylindrical member arranged about the same longitudinal axis as said tool-suporting member, combined spring and damper elements formed of high-hysteresis elastomeric material interposed and forming the sole bridging connection between said tool-supporting member and said other cylindrical member, and means for deforming said elastomeric material to alter the stiffness of the bridging connection and thus adjust the degree of elastic coupling between said spring and damper means and said cylindrical members, said deforming means comprising confining members confining said elements between an end surface on said further cylindrical member in an annulus having opposing side walls and means coupled between said confining members and said cylindrical member for producing relative axial movement therebetween, thereby to bulge the compressed material in a radial direction into firmer contact with the vibratory member to be damped.

14. Vibration absorbing or suppressing means for a primary body which is subject to vibration, said means comprising an auxiliary mass juxtaposed to said body and coupled only to said primary body, said auxiliary mass having a longitudinal axis, at least two bodies of high hysteresis elastic material positioned between and in contact with said body and said mass and directly coupling them elastically, said elastic material being the sole coupling between said primary body and said auxiliary mass, said bodies of elastic material being in at least two zones spaced longitudinally of said auxiliary mass and coaxial with said mass, and means bearing on said elastic material for straining said elastic material, whereby the stiffness of said material can be tuned to the correct frequency for maximum reduction in vibration amplitude of the primary body.

15. Vibration absorbing means as claimed in claim 14, wherein said masses are first and second cylindrical members, said second cylindrical member being encircled by said first cylindrical member.

References Cited by the Examiner
UNITED STATES PATENTS

| | | | |
|---|---|---|---|
| 1,657,390 | 1/1928 | Halikman | 188—1 |
| 2,051,954 | 8/1936 | Leland | 188—1 X |
| 2,614,896 | 10/1952 | Pierce | 188—1 X |
| 2,714,823 | 8/1955 | Dall et al. | |
| 2,819,060 | 1/1958 | Neidhart. | |
| 2,819,063 | 1/1958 | Neidhart. | |
| 2,964,272 | 12/1960 | Olson | 188—1 X |

DUANE A. REGER, *Primary Examiner.*

MILTON BUCHLER, *Examiner.*